United States Patent
Somerville

(10) Patent No.: US 11,245,723 B2
(45) Date of Patent: Feb. 8, 2022

(54) DETECTION OF POTENTIALLY DECEPTIVE URI (UNIFORM RESOURCE IDENTIFIER) OF A HOMOGRAPH ATTACK

(71) Applicant: Forcepoint, LLC, Austin, TX (US)

(72) Inventor: Luke Somerville, Reading (GB)

(73) Assignee: Forcepoint, LLC, Austin, TX (US)

( * ) Notice: Subject to any disclaimer, the term of this patent is extended or adjusted under 35 U.S.C. 154(b) by 535 days.

(21) Appl. No.: 16/178,998

(22) Filed: Nov. 2, 2018

(65) Prior Publication Data

US 2020/0145457 A1    May 7, 2020

(51) Int. Cl.
*H04L 29/06* (2006.01)

(52) U.S. Cl.
CPC ...... *H04L 63/1483* (2013.01); *H04L 63/1416* (2013.01)

(58) Field of Classification Search
CPC ................. H04L 63/1483; H04L 63/1466
See application file for complete search history.

(56) References Cited

U.S. PATENT DOCUMENTS

| | | | |
|---|---|---|---|
| 7,574,740 B1 | 8/2009 | Kennis | |
| 7,882,538 B1 | 2/2011 | Palmer | |
| 8,230,505 B1 | 7/2012 | Ahrens et al. | |
| 10,193,923 B2 * | 1/2019 | Wright | H04L 63/1483 |
| 10,523,609 B1 * | 12/2019 | Subramanian | H04L 63/1416 |
| 2002/0078382 A1 | 6/2002 | Sheikh et al. | |
| 2003/0145225 A1 | 7/2003 | Bruton et al. | |
| 2003/0145226 A1 | 7/2003 | Bruton et al. | |
| 2003/0188189 A1 | 10/2003 | Desai et al. | |
| 2005/0138402 A1 | 6/2005 | Yoon et al. | |
| 2006/0085543 A1 | 4/2006 | Hrastar et al. | |
| 2006/0117172 A1 | 6/2006 | Zhang et al. | |
| 2007/0208813 A1 | 9/2007 | Blagsvedt et al. | |
| 2008/0082722 A1 | 4/2008 | Savagaonkar et al. | |
| 2009/0249466 A1 | 10/2009 | Motil et al. | |
| 2009/0254572 A1 | 10/2009 | Redlich et al. | |
| 2010/0010968 A1 | 1/2010 | Redlich et al. | |
| 2010/0049975 A1 * | 2/2010 | Parno | H04L 63/08 713/168 |
| 2013/0080641 A1 | 3/2013 | Lui et al. | |
| 2013/0085761 A1 | 4/2013 | Bringert et al. | |
| 2013/0086636 A1 * | 4/2013 | Golovanov | H04L 63/145 726/3 |
| 2013/0231084 A1 | 9/2013 | Raleigh | |

(Continued)

OTHER PUBLICATIONS

"Heuristic", Wikipedia, 11 pages, last edited: Sep. 9, 2021. (Year: 2021).*

(Continued)

*Primary Examiner* — Ponnoreay Pich
(74) *Attorney, Agent, or Firm* — Terrile, Cannatti & Chambers; Stephen A. Terrile

(57) ABSTRACT

Disclosed herein is technology that detects potentially deceptive URI (Uniform Resource Identifier) of a homograph attack (e.g., an Internationalized Domain Name (IDN) homograph attack). In one or more implementations, the detection may be accomplished, at least in part, by assessing the likelihood that all of the characters in the URI (e.g., domain name) were typed on a keyboard using a single keyboard map. This Abstract is submitted with the understanding that it will not be used to interpret or limit the scope or meaning of the claims.

19 Claims, 3 Drawing Sheets

(56) References Cited

U.S. PATENT DOCUMENTS

| | | |
|---|---|---|
| 2013/0275574 A1 | 10/2013 | Hugard, IV et al. |
| 2013/0298192 A1 | 11/2013 | Kumar et al. |
| 2014/0013426 A1* | 1/2014 | Douceur ............ H04L 63/1483 726/22 |
| 2014/0198958 A1 | 7/2014 | Nathan et al. |
| 2015/0007312 A1* | 1/2015 | Pidathala ............ H04L 63/145 726/22 |
| 2015/0066896 A1 | 3/2015 | Davis et al. |
| 2015/0156210 A1* | 6/2015 | Hunt ................ H04L 63/1408 726/23 |
| 2015/0261969 A1 | 9/2015 | Frost |
| 2016/0042179 A1 | 2/2016 | Weingarten et al. |
| 2016/0055334 A1 | 2/2016 | Herwono et al. |
| 2016/0148019 A1 | 5/2016 | Rambler et al. |
| 2017/0126718 A1 | 5/2017 | Baradaran et al. |
| 2017/0149795 A1 | 5/2017 | Day, II |
| 2017/0214705 A1 | 7/2017 | Gupta |
| 2017/0244729 A1 | 8/2017 | Fahrny et al. |
| 2017/0302822 A1 | 10/2017 | Vandeweerd et al. |
| 2017/0329966 A1 | 11/2017 | Koganti et al. |
| 2019/0034625 A1 | 1/2019 | Ford et al. |
| 2019/0044967 A1* | 2/2019 | Sukhomlinov ..... H04L 63/1483 |
| 2019/0124117 A1 | 4/2019 | Swafford |
| 2019/0124118 A1 | 4/2019 | Swafford |
| 2020/0076835 A1* | 3/2020 | Ladnai ................ G06N 5/022 |
| 2020/0134192 A1 | 4/2020 | Gupta et al. |
| 2020/0145457 A1* | 5/2020 | Somerville ......... H04L 63/1416 |
| 2020/0234243 A1 | 7/2020 | Miron et al. |
| 2020/0242260 A1 | 7/2020 | Chen et al. |
| 2020/0257821 A1 | 8/2020 | Lai |
| 2020/0257822 A1 | 8/2020 | Ford et al. |
| 2020/0257823 A1 | 8/2020 | Ford et al. |

OTHER PUBLICATIONS

"Heuristic (computer science)", Wikipedia, 5 pages, last edited: Aug. 18, 2021. (Year: 2021).*

"Heuristically—definition of heuristically by The Free Dictionary", 1 page, copyright 2016. (Year: 2016).*

SANS ISC InfoSec Forums, Tool to Detect Active Phishing Attacks Using Unicode Look-Alike Domains, downloaded Nov. 1, 2018, https://isc.sans.edu/forums/diary/Tool+to+Detect+Active+Phishing+Attacks+Using+Unicode+LookAlike+Domains/22310/.

Symantec.com, Which tuning is available for improving the performance of Symantec Endpoint Protection clients during scan, https://support.symantec.com/en_US/article.TECH143941.html, Jan. 6, 2011.

Microsoft.com, Windows Search Overview, https://msdn.microsoft.com/en-US/library/windows/desktop/aa965362, printed Nov. 20, 2017.

Stephen G. Dimmock et al., Is Fraud Contagious? Co-Worker Influence on Misconduct by Financial Advisers, The Journal of Finance, first published online Feb. 3, 2018.

Thomas R. Hurd et al., A framework for analyzing contagion in assortative banking networks, PLoS ONE 12(2):e0170579, 2017.

* cited by examiner

DETECTION OF POTENTIALLY DECEPTIVE URI (UNIFORM RESOURCE IDENTIFIER) OF A HOMOGRAPH ATTACK

BACKGROUND

A "black hat" (e.g., malicious internet con artist) wishes to lure an unsuspecting target to a website of their creation. In doing so, the black hat hopes to extract personal or financial information from the target, download malicious software onto the target's machine or device, or otherwise act in a fraudulent or harmful manner to the target.

Often, the black hat accomplishes this feat by creating a counterfeit or fake website of a well-known company or organization. While the black hat has the means to create deceptive content of its website, the black hat does not own or control the domain name of the original website.

To fool the internet denizens, the black hat may use a fake Uniform Resource Locator (URL), colloquially termed a web address, that appears similar to the real URL of the genuine website, but the fake URL differs in at least some ways. This type of attack is often called a homograph attack. For example, a simple homograph attack may use fake URL that swaps the letters for numbers. Examples of this include www.g00gle.co.uk and bl00mberg.com.

Generally, in a homograph attack, the black hat attempts to deceive an internet user by leveraging the similarities in the appearance between a fake URL and a genuine URL to lure the user into visiting the black hat's website using the fake URL. This attack has some known aliases: homoglyph attack, script spoofing, and homograph domain name spoofing. Also, this type of attack may be part of a so-called phishing attack.

Characters (e.g., letters and numbers) that look alike are called homoglyphs or homographs, thus the name of the attack. Examples of such are the Latin small letter O (U+006F) and the digit zero (U+0030). Hypothetically, one might register bl00mberg.com or g00gle.com and get away with it.

In an internationalized domain name (IDN) homograph attack, a black hat creates and registers one or several fake domains using at least one look-alike character from a different language. Again, hypothetically, one might register google.com, but not before swapping the Latin small letter O (U+006F) with the Greek small letter Omicron (U+03BF).

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein is technology that detects potentially deceptive URI (Uniform Resource Identifier) of an Internationalized Domain Name (IDN) homograph attack. In one or more implementations, the detection may be accomplished, at least in part, by assessing the likelihood that all of the characters in the URI (e.g., domain name) were typed on a keyboard using a single keyboard map. For example, a URI may be flagged as risky if the characters of that URI are from two or more different keyboard maps. That is, a URI may be determined to be potentially deceptive when none of multiple keyboard map sets include all of the characters or symbols of the obtained URI.

Typically, a human user types a domain name on a computer when seeking registration of domain name. It difficult and uncommon for humans to change their keyboard layout while typing (e.g., changing languages mid-word). Thus, it is unlikely that a human user innocently changed languages mid-word when typing a new domain name that they were seeking to register. Rather, it seems much more likely that the user was attempting to deceive by using visually similar characters from a different language.

A Uniform Resource Identifier (URI) is a compact sequence of characters that identifies an abstract or physical resource. A URI can be further classified as a locator, a name, or both. The term "Uniform Resource Name" (URN) refers to the subset of URIs that identifies a resource in a globally unique way. That is, the URN provides the name of the resource. The most common example of a URN is an internet domain name. The term "Uniform Resource Locator" (URL) refers to the subset of URIs that, in addition to identifying a resource (thus includes the URN), provide a means of locating the resource by describing its primary access mechanism (e.g., its network "location").

For simplicity, the description hereafter refers to URI. However, particular implementations may be focused on the URN and/or the URL, which are subsets of the URI.

Example Network Infrastructure

Figure 1:
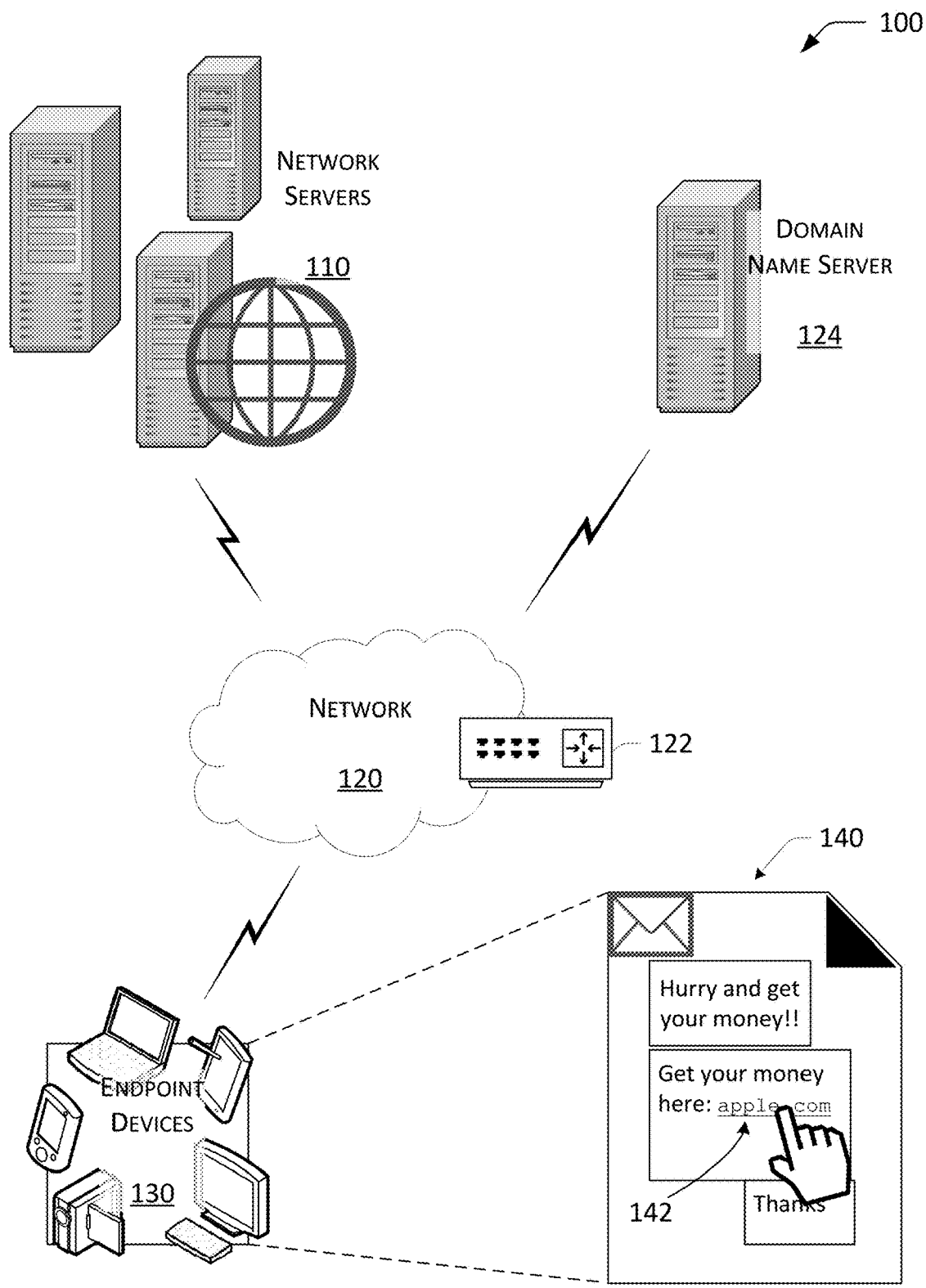
FIG. 1 is a block diagram illustrating an example infrastructure suitable for incorporation of implementations in accordance with the technology described herein.

FIG. 1 simplified illustration of an example network infrastructure 100 that is suitable for implementation of the technology described herein. The example network infrastructure 100 includes network servers 110, a network 120, and endpoint devices 130.

The network servers 110 represent resources that are available via networks such as the network 120. These resources are often hosted by one or more operating servers. A common example of such a resource is a website. A website is, for example, a collection of related web pages, including multimedia content, typically identified with a common domain name, and published on at least one server (which is commonly called a web server).

The network 120 may be a public Internet Protocol (IP) network, such as the Internet, a private local area network (LAN), or a combination of both. A website may be accessible via the network 120 by referencing a URI that identifies the site. The network 120 includes a router 122 and a domain name server (DNS) 124.

While it is called a "router" herein, the router 122 may be any intermediate network device that facilitates or routes network traffic between the endpoint devices 130 and the network servers 110. A typical example of a router 122 includes an Internet gateway that provides access to the Internet to a private LAN and/or an endpoint device. In some implementations, a portion of the function of the router 122 may be performed by the endpoint device itself (e.g., a web browser or web filter).

The endpoint devices 130 is an information processing system. Examples of an endpoint device include a personal computer, a laptop computer, a tablet computer, a personal digital assistant (PDA), a smart phone, a mobile telephone, a digital camera, a video camera, or other device capable of storing, processing and communicating data. In various embodiments, the communication of the data may take place in real-time or near-real-time. In certain embodiments, the communication of the information may take place asynchronously. For example, an email message may be stored on an endpoint device when it is offline. In this example, the information may be communicated to its intended recipient once an endpoint device gains access to the network 120.

In one or more implementations, the endpoint device 130 is configured to store non-transitory machine-readable storage medium that is encoded with instructions executable by one or more processors. The instructions may be part of the computer-executable module. In one or more implementations, the endpoint device 130 may be configured to execute modules such as a web browser, email programs, web filter, firewall, or the like.

Consider a URI that includes the legitimate domain name of "apple.com." For this example, all of the letters of this domain are exactly how they appear. For example, the "a" is the Unicode Basic Latin "a." Separately or in cooperation with each other, the web browser or the router 122 seek to resolve the "apple.com" domain name when the user requests access to the resources using that domain name.

In short, the domain name resolution process involves an inquiry to the DNS 124 to find the unique IP address of the server or servers associated with the requested domain name. DNS 124 are the Internet's equivalent of a phone book. They maintain a directory of domain names and translate them to Internet Protocol (IP) addresses. With the unique IP address in hand, the content (e.g., website) is requested from that IP address and subsequently delivered to the endpoint device 130.

As depicted in FIG. 1, the endpoint device 130 has received an unsolicited email message 140. This message includes an IDN homograph attack. In particular, the attack involves a fake domain name 142 of "apple.com." The fake domain name "apple.com" 142 appears identical to the legitimate domain name of "apple.com." However, the former uses the character "a" from the Unicode Cyrillic character set as opposed to the Unicode Basic Latin "a".

Because of this, a black hat can register a domain that mimics those of legitimate organizations. This provides a means of attack that is almost impossible for a user to detect simply by looking at the URI. This is called an internationalized domain name (IDN) homograph attack.

The black hat often creates a fake website to go along with the malicious domain name of their IDN homograph attack. Thus, when a user clicks on a link that appears to be a legitimate domain name, the deception may be solidified when the user is presented with a fake website the visually appears no different from the legitimate one.

When the fake domain name "apple.com" 142 is resolved, the DNS 124 returns an IP address associated with the fake website rather than the one associated with the legitimate domain name of "apple.com." Thus, the user receives website content of the fake website that specifically designed to convince her that it is legitimate.

The traditional approach to address this problem is a blacklist. That is, a static list of homographs is created and distributed from time to time. This is a list of known "bad" URIs are created as there are encountered and reported. Of course, this approach is reactive and depends on the cooperation of those who have been deceived and are willing to admit as much.

Example Machine-Encoded Graphemes and Keyboard Maps

Fundamentally, computers are electrical circuits that represent numeric values electronically. All other information is represented in the computer as a machine-encoded numeric value. For example, when stored by a computer, each character in this paragraph may be represented by a character-encoding scheme where each character has its own unique value in a table or standard that associates values with characters. An example of such a standard is ASCII, which is an abbreviated from the American Standard Code for Information Interchange.

Of course, a character-encoding scheme may encode more than just characters. For example, they may encode spaces, symbols, emojis, punctuation marks, and the like. Until this point, the term "character" has been used primarily in a broad manner. However, the term "grapheme" better captures that concept. In linguistics, a grapheme is the smallest unit of a writing system of any given language. An individual grapheme may or may not carry meaning by itself and may or may not correspond to a single phoneme of the spoken language.

Thus, the term grapheme indicates a small and possibly the smallest unit (e.g., a letter) of a writing system of a language. Hereinafter, the term machine-encoded grapheme represents encoding for a grapheme. Graphemes include, for example, characters, text, symbols, emojis, alphabetic letters, numerical digits, typographic ligatures, Chinese characters, punctuation marks, symbols, signs, glyphs, mathematical symbols, spaces, word dividers and the like.

To avoid conflicting codes for different graphemes amongst different grapheme-encoding schemes, some supersets of machine-encoded graphemes has been developed that provides a unique code for each unique grapheme. Unicode is an example of such a superset.

Unicode is an example of a machine-encoded grapheme superset. Unicode is a computing industry standard for the consistent encoding, representation, and handling of text expressed in most of the world's writing systems. The standard is maintained by the Unicode Consortium, and as of June 2018 the most recent version, Unicode 11.0, contains a repertoire of 137,439 characters covering 146 modern and historic scripts, as well as multiple symbol sets and emojis.

To ensure backward compatibility of legacy systems, Unicode contains many duplicate graphemes. Also, because the graphemes of different languages have similar origins, it is common for visually identical or nearly identical graphemes to appear repeatedly in Unicode.

Typically, textual data is manually entered into a computer using a physical or virtual keyboard. A keyboard uses an arrangement of buttons or keys to act as mechanical levers or electronic switches. The layout of a keyboard is the grapheme or function of each key on that keyboard. A keyboard map set is the group of machine-encoded graphemes that are mapped to the keyboard having a designated layout.

For example, the "a" key pressed with a Basic Latin (i.e., ASCII) layout may produce a specific code that is the Unicode Basic Latin "a" of a Basic Latin keyboard map set. In another example, the "a" key pressed with the Unicode Cyrillic layout may produce a different code that is the Unicode Cyrillic "a" of a Unicode Cyrillic keyboard map set.

Consider an American English keyboard layout may use the Basic Latin (i.e., ASCII) map set of Unicode. That is, each key of the keyboard layout has one or more machine-encoded grapheme associated therewith. In this way, a particular numerical value is generated when a particular key is pressed. That value is assigned based on the associated keyboard map set.

For example, a user presses the A key on a Basic Latin keyboard. This is a keyboard layout associated with the Basic Latin (i.e., ASCII) map set of Unicode. In response to the keypress, the computer produces a hexadecimal value of 0x61 (presuming lowercase letter) based on the Unicode's Basic Latin map set.

In another example, consider the use of a Unicode's Cyrillic keyboard map set. In response to the user pressing the A key, the computer produces a hexadecimal value of 0x430 (presuming lowercase letter) based on the Cyrillic keyboard that uses the Cyrillic keyboard map set. Visually, the grapheme (e.g., letter) produced by this Cyrillic keyboard is a lowercase "a" and is visually indistinguishable from the grapheme produced by a Basic Latin keyboard. However, the machine-encoded number values of these visually indistinguishable or similar graphemes differ. One is 0x61 and the other 0x430.

Thus, it may be difficult or impossible for a human to tell the difference visually between the graphemes produced using different keyboard map sets. However, a comparison of their machine-encoded numeric values reveals their differences.

Furthermore, each keyboard map set has its own defined range of valid values. For example, the range of valid values for the Basic Latin keyboard map set is 0x00-0x7F, and the range of valid values for the Cyrillic keyboard map set is 0x400-0x4FF.

URIs with Graphemes from Mixed Keyboard Map Sets

Typically, a human user types a domain name on a computer when seeking registration of domain name. It difficult and uncommon for humans to change their keyboard layout while typing (e.g., changing languages mid-word). Thus, it is unlikely that a human user innocently changed languages mid-word when typing a new domain name that they were seeking to register. Rather, it seems much more likely that the user was attempting to deceive by using visually similar characters from a different language.

Typically, legitimate URIs (including those that use international graphemes) are easy to type by hand using a keyboard map local to the language being used. For example, "президент.рф" and "alliancefrançaise.nu" can be typed easily using a Russian and French keyboard, respectively.

However, malicious URIs will likely mix graphemes from different or even distant portions of the Unicode table. That is, malicious URIs may include graphemes from different and perhaps distant keyboard map sets (e.g., Basic Latin and Cyrillic) of a grapheme superset (e.g., Unicode). For example, machine-encoded graphemes of a given URI may be considered distant when there are more than two keyboard map sets between the values of the machine-encoded graphemes.

For example, the fake domain name "apple.com" 142 would require a user to type one character in a Cyrillic keyboard map before switching to a Latin or extended Latin map to type the remainder of the domain name.

By comparing the characters used within a given URI to known valid combinations of Unicode blocks, a system can determine whether or not a user would need to switch keyboards mid-URI in order to enter the URI manually. This can be used as an indicator of increased risk allowing a number of options to protect users further to be deployed.

For example, the alphabetic characters of the malicious version of "apple.com" break down into the following hexadecimal values:
a—0x430
p—0x70
p—0x70
l—0x6c
e—0x65
.—0x2e
c—0x63
o—0x6f
m—0x6d There is a significant distance between 0x430 (decimal 1072; Unicode block "Cyrillic") and the next nearest value of 0x70 (decimal 112; Unicode block "Basic Latin"). The blocks in which these values sit within the Unicode table implies that the keyboard map required to type these characters changes part way through the domain name and that any user is, therefore, unlikely to have manually input this URL.

This technique can further be used to detect the approach of using invisible or hard-to-see combining diacritical marks. Taking the domain "hotmail.com" (the mark may or may not be visible depending on the font used to render it) as an example, this breaks down as:
h—0x68
o—0x6f
t—0x74
m—0x6d
a—0x61
i—0x69
[combining dot above]—0x307
l—0x6c Again, based on the difficulty of typing this combination of characters and the significant distance of the combining diacritical mark from the other characters within the string, the URI may be flagged for further analysis and/or the user be notified of the threat.

In some implementations described herein, a URI is flagged as being potentially deceptive when the distance (e.g., difference) between any two machine-encoded graphemes in the URI is greater than one keyboard map set. In some instances, a map set is 0x7F wide. That is, the range of the map set is 127 (decimal). Thus, in these implementations, a URI is flagged if the difference of at least two machine-encoded graphemes is greater than 127.

Valid combinations of Unicode blocks (e.g., keyboard map sets) do exist. For example, many European keyboards can produce characters contained in the blocks: "Basic Latin," "Latin-1 Supplement," "Latin Extended-A," and "Latin Extended-B." However, these blocks are usually adjacent to the Unicode table.

A notable exception to this is the Japanese language, which draws from the Unicode blocks "Katakana," "Hiragana," and "CJK Unified Ideographs." These are not adjacent within the Unicode table:
Hiragana—0x3040 to 0x309F
Katakana—0x30A0 to 0x30FF
CJK Unified Ideographs—0x4E00 to 9FFF However, several East Asian languages make use of the "CJK Unified Ideographs" block, and these are broadly adjacent within the Unicode table, roughly spanning the range 0x3000 to 0x9FFF.

In some implementations described herein, a URI is flagged as being potentially deceptive when the distance (e.g., difference) between at least two machine-encoded graphemes in the URI is greater than multiple (e.g., 2)

keyboard map sets. Thus, in these implementations, a URI may be flagged when the difference of at least two machine-encoded graphemes is greater than 255 (e.g., for 2 map sets).

More generally, a URI maybe flagged when two or more of its graphemes have values that indicate that they are at least one (but perhaps more) valid keyboard map sets apart. Knowledge of the valid ranges of existing blocks (e.g., keyboard map sets) in the grapheme superset (e.g., Unicode) is helpful in making the determination of whether machine-encoded graphemes are from differing keyboard map sets and how many map sets separate them.

In addition, some machine-encoded graphemes might not belong to any particular keyboard block set of the superset. The existence of one of these orphaned machine-encoded graphemes in a URI may initiate a flag by itself. By their nature, the orphaned machine-encoded graphemes were not manually entered on a keyboard by a human using one keyboard map set.

Example Processes

Figure 2:
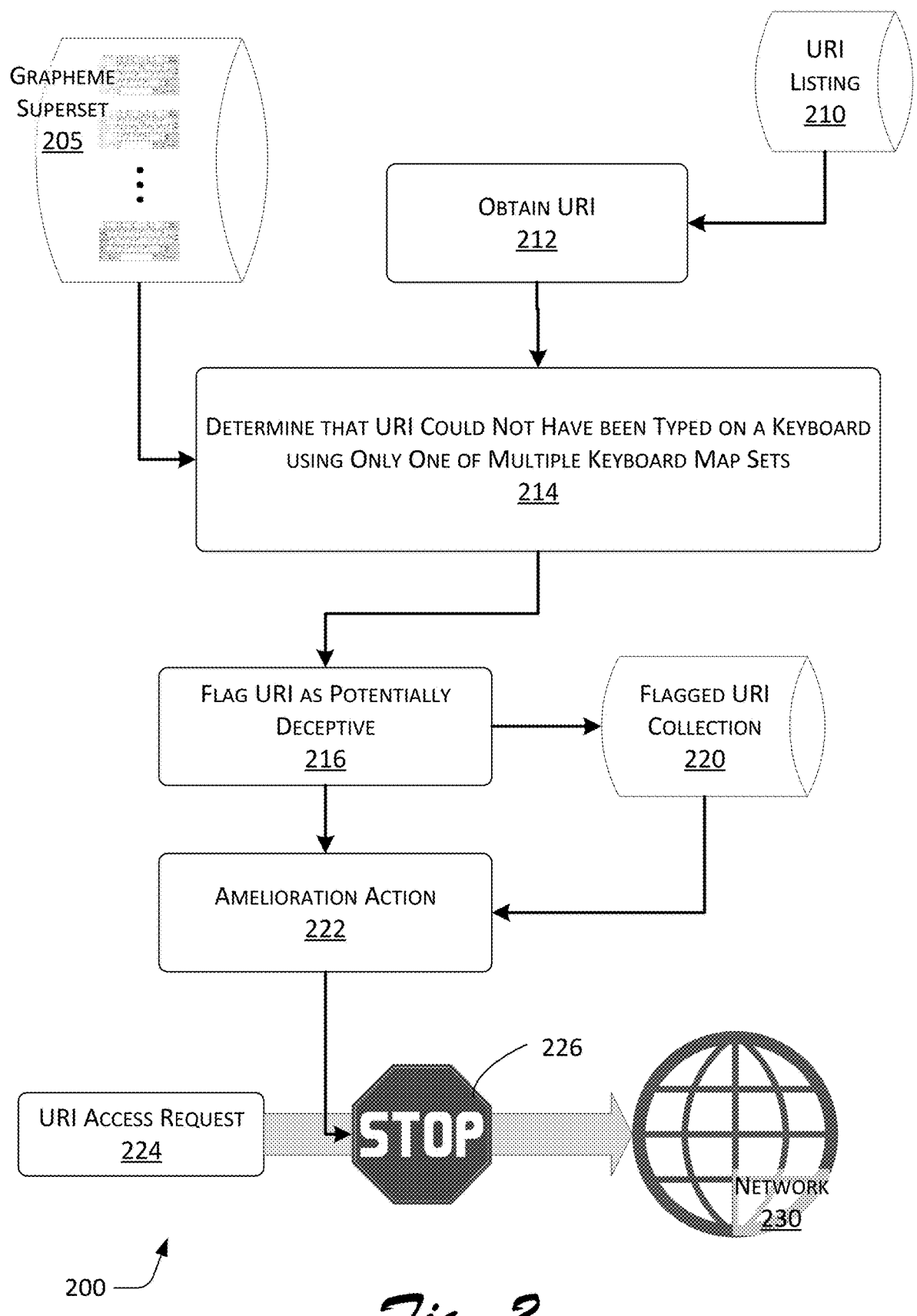
FIG. 2 is a flowchart illustrating an example process in accordance with the technology described herein.

FIG. 2 is a flow diagram illustrating example process 200 that implement the techniques described herein for detection of potentially deceptive URI (e.g., domain name) of a homograph attack. The process 200 is performed by one or more parts of the example network infrastructure 100. For example, the process 200 may be performed by one or more of the network 120 and the endpoint devices 130.

In some implementations, the router 122 may perform, at least in part, the process 200. In other implementations, the endpoint device 130 may perform, at least in part, the process 200. For example, program modules (such as a web browser, messaging program, network filter, or the like) may perform, at least in part, the process 200. For the sake of simplicity, the subject preforming the example process 200 is called a "system" herein.

A machine-encoded grapheme superset 205 is a table of machine-encoded graphemes that are grouped in sets of similar or like graphemes. Examples of graphemes of the machine-encoded grapheme superset 205 include characters, text, symbols, emojis, alphabetic letters, numerical digits, typographic ligatures, Chinese characters, punctuation marks, symbols, signs, glyphs, mathematical symbols, word dividers, and the like.

A set of the machine-encoded grapheme superset 205 may be, for example, from a grouping of graphemes used by a particular country or language. The machine-encoded grapheme superset 205 includes multiple keyboard map sets. A keyboard map set includes a group of graphemes mapped to particular keyboard layout or keyboard language.

Unicode is an example of the machine-encoded grapheme superset 205. This superset may be stored and accessed locally (to the device executing the process 200) or remotely. Alternatively, metadata regarding the machine-encoded grapheme superset 205 may be stored and accessed locally or remotely. Examples of such metadata include the ranges of valid values used by the multiple keyboard map sets.

A URI listing 210 includes a listing of URIs queued for processing by the example process 200. The URI listing 210 may include recently registered URIs. For example, the URI listing 210 may be a list of recently registered domain names of IDN (Internationalized Domain Name) registry. That is, the URI listing 210 may be a list of as-of-yet unprocessed domain names that may include graphemes from multiple keyboard map sets. One of the URIs of the URI listing 210 is provided to the process 200.

At 212, the system obtains a URI, such as a domain name. The URI includes machine-encoded graphemes from the superset of such graphemes, such as the machine-encoded grapheme superset 205.

The URI may be obtained from the URI listing 210. In some instances, the obtained URI listing may be one that user selected (e.g., "clicked on") in an email, text, or other message or on a web page.

At 214, the system determines that at least two of the machine-encoded graphemes of the obtained URI are derived from differing keyboard map sets of the machine-encoded grapheme superset 205. This may be accomplished in numerous ways.

For example, the system may make this determination, at least in part, by finding the differences between pairs of machine-encoded graphemes in the obtained URI and compares those differences a threshold value. If at least one of those differences is greater than that threshold value, then there is a suspicion that the URI is a potentially deceptive homograph attack.

In some implementations, the particular value of the threshold may be determined heuristically or via machine-learning using a training corpus of legitimate and deceptive URIs.

Since the determination of block 214 is particular about the use of differing keyboard map sets, the threshold may be set to be at least as great as the width of a keyboard map set. This, a pair of graphemes are from differing keyboard map sets of the grapheme superset.

In that case, the threshold value is called the map-set threshold. This can be based on a fixed common width of the keyboard map sets of the machine-encoded grapheme superset 205.

In other instances, the map-set threshold can be set based on the width of the smallest keyboard map set, the longest keyboard map set, mean width of the keyboard map sets, or some other statistic characterizes the width of the keyboard map sets of the machine-encoded grapheme superset 205.

This may be described as "identifying a difference greater than a map-set threshold that indicates that at least a pair of the machine-encoded graphemes is from differing keyboard map sets of the grapheme superset."

In other implementations, the threshold may be a multi-map-set threshold and is intended to indicate that the multiple map sets separate the keyboard map sets used by the graphemes from different sets. This may be described as "identifying a difference greater than a multi-map-set threshold that indicates that at least a pair of the machine-encoded graphemes are from differing keyboard map sets of the grapheme superset by a distance of two or more keyboard map sets."

In some implementations, the differences may be based on a cumulative difference between three or more of the machine-encoded graphemes of the obtained URI. When this exceeds a defined threshold, it may mean that the machine-encoded graphemes are from at least three different keyboard map sets.

In other implementations, the system may make the determination of 214, at least in part, by identifying at least one of the at least one of the machine-encoded graphemes of the obtained URI is not part of or contained in any of the multiple keyboard map sets of the machine-encoded grapheme superset 205.

In some implementations, the system may employ a lookup table based on or associated with the grapheme superset 205. This lookup table identifies the keyboard map sets and the value ranges of the machine-encoded graphemes of the values associated with each set. In this way, the system can quickly identify whether a URI has graphemes from differing sets or from a non-valid range.

At 216, in response to the determination of 214, the system flags the obtained URI as a potentially deceptive URI of a homograph attack. This may include adding the flagged URI to the Flagged URI Collection 220, which is a listing of known potentially deceptive URIs. In some instances, the URIs of the flagged URI collection 220 may be manually examined by humans to confirm their deceptive nature.

At 222, the system may take additional amelioration action, such as sending a notification to a network administrator or a user regarding the flagged URI as a potentially deceptive URI. For example, the system may intercept thus user's initial click with a confirmation/warning page before continuing to the URI in question. This may be called "wrapping." In some instances, the system may block or stop 226 the request to access 224 resources (e.g., web pages) located on a network 230 by the flagged URI. That is, the system may prevent or deny the access to content at the flagged URI.

In some implementations, the system may calculate a threat-confidence ranking of the likelihood that a flagged URI is deceptive. This calculation may be based on one or more of the following:

size of the difference between pairs of machine-encoded graphemes in the flagged URI;
the cumulative difference of multiple machine-encoded graphemes of the flagged URI;
how many keyboard map sets are represented by the machine-encoded graphemes of the flagged URI.

Many legitimate international domain names exist as part of IDNs that use common ASCII top-level-domains (TLDs), such as ".com" and ".net." Thus, some implementations may ignore the characters of the TLD. Equally, the full-stop/ period symbol resides in the Basic Latin section of the Unicode table and can, therefore, be disregarded in some implementations. Further, since many languages use standard Western Arabic numerals (0 . . . 9), some implementations may ignore such numerals for the analysis. More generally, grouping of a commonly used graphemes (such as the standard Western Arabic numerals) may be excluded from the analysis of some implementations because their usage is likely to be innocent rather than malicious.

Example Information Handling System

Figure 3:
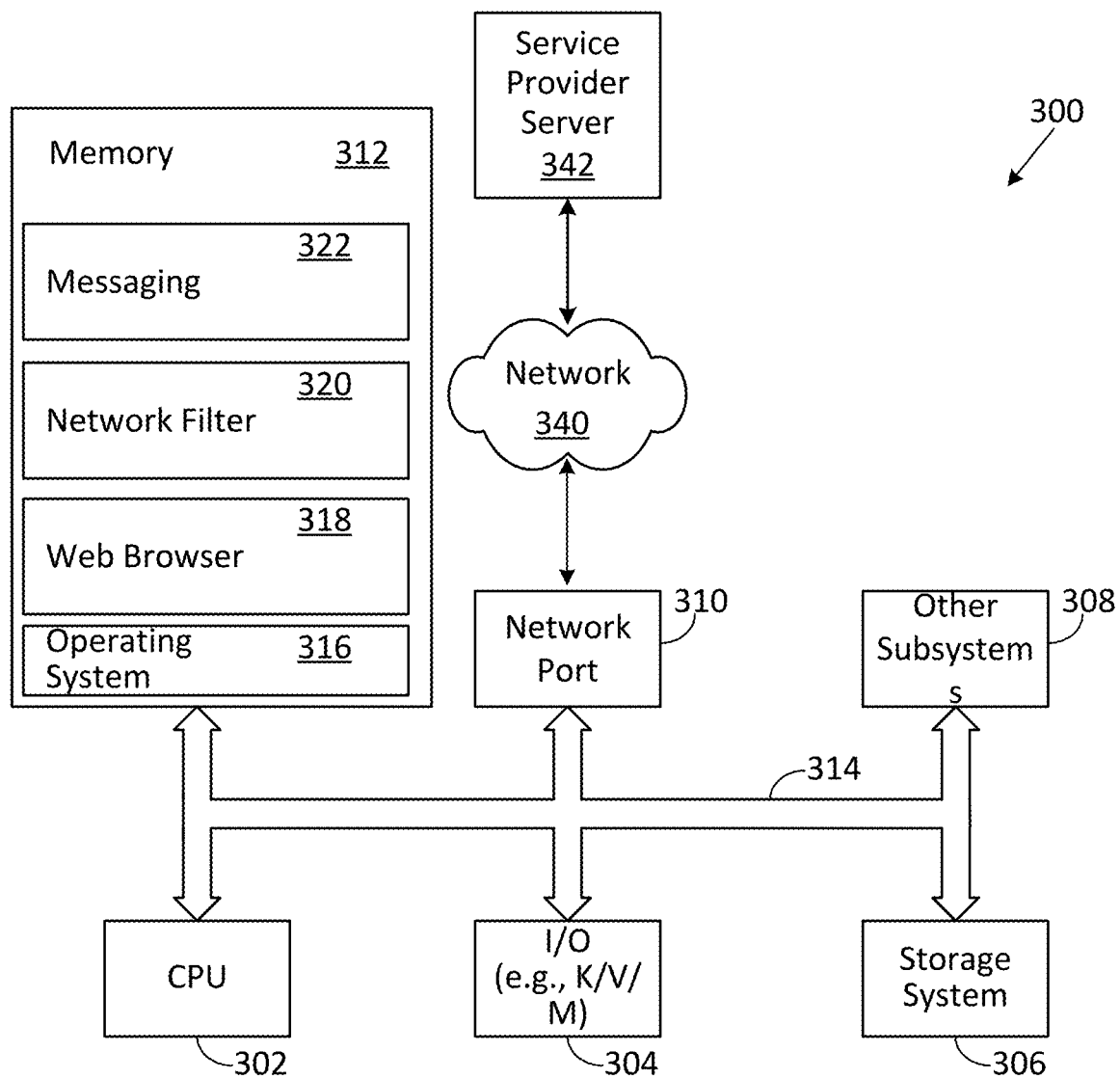
FIG. 3 is a block diagram illustrating an example system in accordance with the technology described herein.

FIG. 3 is a generalized illustration of an information handling system 300 that can be used to implement the technology described herein. The information handling system 300 includes one or more processors (e.g., central processor unit or "CPU") 302, input/output (I/O) devices 304, such as a display, a keyboard, a mouse, and associated controllers, a storage system 306, and various other subsystems 308. In various embodiments, the information handling system 300 also includes network port 310 operable to connect to a network 340, which is likewise accessible by a service provider server 342.

The information handling system 300 likewise includes system memory 312, which is interconnected to the foregoing via one or more buses 314. System memory 312 further includes an operating system (OS) 316 and in various embodiments may also include a web browser 318, network filter 320, and a messaging application 322. In one embodiment, the information handling system 300 is able to download the web browser 318, the network filter 320, and/or the messaging application 322 from the service provider server 342. In another embodiment, the web browser 318, the network filter 320, and/or the messaging application 322 is provided as a service from the service provider server 342.

In various embodiments, in combination, alone, or with cooperation with the service provider 342 and/or the network 340, the web browser 318, the network filter 320, and/or the messaging application 322 performs the operations of the technology described herein. As will be appreciated, once the information handling system 300 is configured to perform the detection of potentially deceptive URI of a homograph attack, as described herein, the information handling system 300 becomes a specialized computing device specifically configured to perform such detection operations and is not a general purpose computing device. Moreover, the implementation of the web browser 318, the network filter 320, and/or the messaging application 322 on the information handling system 300 improves the functionality of the information handling system 300 and provides a useful and concrete result of detection of malicious attacks.

Additional and Alternative Implementation Notes

In the above description of example implementations, for purposes of explanation, specific numbers, materials configurations, and other details are set forth in order to better explain the present disclosure. However, it will be apparent to one skilled in the art that the subject matter of the claims may be practiced using different details than the examples ones described herein. In other instances, well-known features are omitted or simplified to clarify the description of the example implementations.

The terms "techniques" or "technologies" may refer to one or more devices, apparatuses, systems, methods, articles of manufacture, and/or executable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context or to be directed to a singular form.

These processes are illustrated as a collection of blocks in a logical flow graph, which represents a sequence of operations that may be implemented in mechanics alone, with hardware, and/or with hardware in combination with firmware or software. In the context of software/firmware, the blocks represent instructions stored on one or more non-transitory computer-readable storage media that, when executed by one or more processors or controllers, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" is non-transitory computer-storage media or non-transitory computer-readable storage media. For example, computer-storage media or computer-readable storage media may include, but are not limited to, magnetic storage devices (e.g., hard disk, floppy disk, and magnetic strips), optical disks (e.g., compact disk (CD) and digital versatile disk (DVD)), smart cards, flash

What is claimed is:

1. A method that facilitates detection of potentially deceptive URI (Uniform Resource Identifier), the method comprising:
   obtaining a URI, the URI containing machine-encoded graphemes from a superset of such graphemes, wherein the superset includes multiple keyboard map sets, wherein each keyboard map set includes a group of graphemes mapped to a keyboard;
   determining that at least two of the machine-encoded graphemes of the obtained URI are derived from differing keyboard map sets;
   finding a difference of the least two of the machine-encoded graphemes based on a threshold value that is determined heuristically or by machine learning using a corpus of legitimate and deceptive URIs;
   flagging the obtained URI as a potentially deceptive URI of a homograph attack, if the threshold is exceeded; and
   blocking a request to access resources at the flagged URL.

2. A method of claim 1 further comprising sending a notification regarding the flagged URI as a potentially deceptive URI.

3. A method of claim 1 further comprising:
   receiving a request to access resources at the flagged URI;
   denying the request to access resources at the flagged URI, if the threshold is exceeded.

4. A method of claim 1, wherein the determining includes:
   finding differences between pairs of machine-encoded graphemes in the obtained URI;
   identifying a difference greater than a map-set threshold that indicates that at least a pair of the machine-encoded graphemes is from differing keyboard map sets of the grapheme superset.

5. A method of claim 1, wherein the determining includes:
   finding differences between pairs of machine-encoded graphemes in the obtained URI;
   identifying a difference greater than a multi-map-set threshold that indicates that at least a pair of the machine-encoded graphemes is from differing keyboard map sets of the grapheme superset by a distance of two or more keyboard map sets.

6. A method of claim 1 further comprising:
   obtaining a listing of registered URIs;
   providing the obtained URI from the listing.

7. A method of claim 1 further comprising:
   obtaining a listing of registered domain names of IDN (Internationalized Domain Name) registry;
   providing the obtained URI from the listing.

8. A method of claim 1, wherein the flagging includes collecting flagged URIs in a collection of potentially deceptive URIs.

9. A method of claim 1, wherein at least one of the machine-encoded graphemes of the obtained URI is not contained in any of the multiple keyboard map sets.

10. A method of claim 1, wherein the graphemes of the superset are selected from a group consisting of characters, text, symbols, emojis, alphabetic letters, numerical digits, typographic ligatures, Chinese characters, punctuation marks, symbols, signs, glyphs, mathematical symbols, and word dividers.

11. A method comprising:
    obtaining a listing of registered URIs of registry of such URIs;
    obtaining a URI from the listing, the URI containing machine-encoded graphemes from a superset of such graphemes, wherein the superset includes multiple keyboard map sets, wherein each keyboard map set includes a group of graphemes mapped to a keyboard;
    determining that at least two of the machine-encoded graphemes of the obtained URI are derived from differing keyboard map sets;
    finding a difference of the least two of the machine-encoded graphemes based on a threshold value that is determined heuristically or by machine learning using a corpus of legitimate and deceptive URIs;
    adding the obtained URI to a collection of potentially deceptive URIs of a homograph attack;
    blocking a request to access resources at any of the URIs in the collection of potentially deceptive URIs.

12. A method of claim 11, wherein the determining is accomplished, at least in part, by resolving that none of the multiple keyboard map sets include all of the machine-encoded graphemes of the obtained URI.

13. A method of claim 11, wherein the determining includes:
    finding differences between pairs of machine-encoded graphemes in the obtained URI;
    identifying a difference greater than a map-set threshold that indicates that at least a pair of the machine-encoded graphemes is from differing keyboard map sets of the grapheme superset.

14. A method of claim 11, wherein the URI registry includes an IDN (Internationalized Domain Name) registry, and the URI is an Internet domain name.

15. A non-transitory machine-readable storage medium encoded with instructions executable by one or more processors, the machine-readable storage medium comprising instructions to perform operations comprising the method of claim 11.

16. A non-transitory machine-readable storage medium encoded with instructions executable by one or more processors, the machine-readable storage medium comprising instructions to perform operations comprising:
    obtaining a URI, the URI containing machine-encoded graphemes from a superset of such graphemes, wherein the superset includes multiple keyboard map sets, wherein each keyboard map set includes a group of graphemes mapped to a keyboard;
    determining that all of the machine-encoded graphemes of the obtained URI could not have been manually entered via a keyboard that employed only one of the multiple keyboard map sets;
    finding a difference of at least two of the machine-encoded graphemes based on a threshold value that is determined heuristically or by machine learning using a corpus of legitimate and deceptive URIs;
    flagging the obtained URI as a potentially deceptive URI of a homograph attack, if the threshold is exceeded;
    blocking a request to access resources at the flagged URL.

17. A non-transitory machine-readable storage medium of claim 16, wherein the determining is accomplished, at least in part, by resolving that at least two of the machine-encoded graphemes of the obtained URI are derived from differing keyboard map sets of the grapheme superset.

18. A non-transitory machine-readable storage medium of claim 16, wherein the operations further comprise:
    obtaining a listing of registered domain names of IDN (Internationalized Domain Name) registry;
    providing the obtained URI from the listing.

19. A non-transitory machine-readable storage medium of claim 16, wherein the graphemes of the superset are selected from a group consisting of characters, text, symbols, emojis, alphabetic letters, numerical digits, typographic ligatures, Chinese characters, punctuation marks, symbols, signs, glyphs, mathematical symbols, and word dividers.

* * * * *